US011926302B2

(12) United States Patent
Michaelsen

(10) Patent No.: US 11,926,302 B2
(45) Date of Patent: Mar. 12, 2024

(54) ELECTRONICALLY CONTROLLED PNEUMATIC BRAKE SYSTEM WITH TWO SINGLE-CHANNEL AXLE MODULATORS AND ABS VALVES, AND VEHICLE HAVING A BRAKE SYSTEM OF THIS TYPE

(71) Applicant: ZF CV SYSTEMS HANNOVER GMBH, Hannover (DE)

(72) Inventor: Arne Michaelsen, Seelze (DE)

(73) Assignee: ZF CV Systems Hannover GmbH, Hannover (DE)

( * ) Notice: Subject to any disclaimer, the term of this patent is extended or adjusted under 35 U.S.C. 154(b) by 330 days.

(21) Appl. No.: 17/517,483

(22) Filed: Nov. 2, 2021

(65) Prior Publication Data
US 2022/0055583 A1    Feb. 24, 2022

Related U.S. Application Data

(63) Continuation of application No. PCT/EP2020/063401, filed on May 14, 2020.

(30) Foreign Application Priority Data

May 28, 2019   (DE) .................... 10 2019 114 270.9

(51) Int. Cl.
*B60T 8/36*   (2006.01)
*B60T 8/176*  (2006.01)
(Continued)

(52) U.S. Cl.
CPC .............. *B60T 8/343* (2013.01); *B60T 8/176* (2013.01); *B60T 8/327* (2013.01); *B60T 13/662* (2013.01);
(Continued)

(58) Field of Classification Search
CPC .......... B60T 8/176; B60T 8/327; B60T 8/343; B60T 13/662; B60T 13/683; B60T 2270/10; B60T 2270/82
(Continued)

(56) References Cited

U.S. PATENT DOCUMENTS 5,090,780 A * 2/1992 Powell ................... B60T 13/665
                                                    303/20
8,967,734 B2 * 3/2015 Frediani ................ B60T 8/1708
                                                    303/9.62

(Continued)

FOREIGN PATENT DOCUMENTS

DE    10 2004 009 466 A1    9/2005
DE    10 2007 021 646 A1    11/2008
(Continued)

OTHER PUBLICATIONS

International Search Report of the European Patent Office dated Jul. 22, 2020 for international application PCT/EP2020/063401 on which this application is based.
(Continued)

*Primary Examiner* — Christopher P Schwartz
(74) *Attorney, Agent, or Firm* — Walter Ottesen, P.A.

(57) ABSTRACT

The disclosure relates to an electronically controlled pneumatic brake system for a utility vehicle, including a front-axle brake circuit with a single-channel front-axle modulator for the control of first and second front-axle service brake actuators, wherein first and second front-axle ABS valves are provided; a rear-axle brake circuit with a single-channel rear-axle modulator for the control of first and second rear-axle service brake actuators, wherein first and second rear-axle ABS valves are provided; a braking-value sensor which has an electrical terminal for the provision of an electronic brake demand signal; and a central electronic control unit which receives the electronic brake demand (Continued)

signal and controls the front-axle and rear-axle modulators. Here, it is provided that the central electronic control unit is formed as a structural unit with the rear-axle modulator and/or the front-axle modulator.

18 Claims, 3 Drawing Sheets

(51) Int. Cl.
    *B60T 8/32*     (2006.01)
    *B60T 8/34*     (2006.01)
    *B60T 13/66*     (2006.01)
    *B60T 13/68*     (2006.01)

(52) U.S. Cl.
    CPC ......... *B60T 13/683* (2013.01); *B60T 2270/10* (2013.01); *B60T 2270/82* (2013.01)

(58) Field of Classification Search
    USPC .............................. 303/3, 15, 20, 113.1, 127
    See application file for complete search history.

(56) References Cited

U.S. PATENT DOCUMENTS

| | | | | |
|---|---|---|---|---|
| 11,052,892 | B2* | 7/2021 | Dieckmann | B60T 13/662 |
| 11,634,109 | B2* | 4/2023 | Goers | B60T 13/683 |
| | | | | 701/70 |
| 11,807,208 | B2* | 11/2023 | Van Thiel | B60T 13/683 |
| 2005/0168064 | A1 | 8/2005 | McCann | |
| 2006/0119174 | A1 | 6/2006 | Frashure | |
| 2010/0141025 | A1 | 6/2010 | Brockmann et al. | |
| 2013/0221735 | A1 | 8/2013 | Kiel et al. | |
| 2019/0152459 | A1 | 5/2019 | Dieckmann et al. | |
| 2019/0337503 | A1 | 11/2019 | Otremba | |
| 2023/0373456 | A1* | 11/2023 | Grzeskowiak | B60T 13/268 |

FOREIGN PATENT DOCUMENTS

| | | |
|---|---|---|
| DE | 10 2008 014 459 A1 | 9/2009 |
| DE | 10 2010 050 578 A1 | 5/2012 |
| DE | 10 2014 006 613 A1 | 11/2015 |
| DE | 10 2014 116 732 A1 | 5/2016 |
| DE | 10 2015 011 296 A1 | 3/2017 |
| DE | 10 2016 005 318 A1 | 11/2017 |
| DE | 10 2017 113 743 A1 | 12/2018 |
| EP | 1 541 437 A2 | 6/2005 |
| EP | 2 090 481 A2 | 8/2009 |
| WO | 2015/193159 A1 | 12/2015 |

OTHER PUBLICATIONS

International Preliminary Report on Patentability dated Nov. 16, 2021 for international application PCT/EP2020/063401 on which this application is based.

Written Opinion of the International Searching Authority dated Jul. 22, 2020 for international application PCT/EP2020/063401 on which this application is based.

\* cited by examiner

ELECTRONICALLY CONTROLLED PNEUMATIC BRAKE SYSTEM WITH TWO SINGLE-CHANNEL AXLE MODULATORS AND ABS VALVES, AND VEHICLE HAVING A BRAKE SYSTEM OF THIS TYPE

CROSS REFERENCE TO RELATED APPLICATIONS

This application is a continuation application of international patent application PCT/EP2020/063401, filed May 14, 2020, designating the United States and claiming priority from German application 10 2019 114 270.9, filed May 28, 2019, and the entire content of both applications is incorporated herein by reference.

TECHNICAL FIELD

The present disclosure relates to an electrically controlled pneumatic brake system for a vehicle, in particular a utility vehicle, exhibiting a front-axle brake circuit with a single-channel front-axle modulator for activating first and second front-axle service-brake actuators, wherein a first front-axle ABS valve is interposed between the front-axle modulator and the first front-axle service-brake actuator, and a second front-axle ABS valve is interposed between the front-axle modulator and the second front-axle service-brake actuator, and also a rear-axle brake circuit with at least one single-channel rear-axle modulator for activating first and second rear-axle service-brake actuators, wherein a first rear-axle ABS valve is interposed between the at least one rear-axle modulator and the first rear-axle service-brake actuator, and a second rear-axle ABS valve is interposed between the rear-axle modulator and the second rear-axle service-brake actuator. The brake system further includes a braking-value transducer, which exhibits at least one electrical terminal, for making an electronic braking-request signal available, and a central electronic control unit, which is connected at least to the braking-value transducer for the purpose of receiving the electronic braking-request signal, and for the purpose of controlling the front-axle and rear-axle modulators is connected to the modulators. The disclosure further relates to a vehicle, in particular a utility vehicle, with a brake system of such a type.

BACKGROUND

Electronically controlled pneumatic brake systems of such a type are known, for instance, from patent applications US 2013/0221735, US 2019/0337503 and US 2019/0152459 from the current applicant.

In particular, US 2019/0152459 discloses an electronically controllable pneumatic brake system with at least two brake circuits, wherein an electrically and pneumatically controllable control valve is assigned to at least one of the at least two brake circuits, and an electrically controllable parking-brake valve is assigned to another of the at least two brake circuits, for predetermining brake pressures for activating wheel brakes of the respective brake circuits. A first control unit is provided, which is configured in such a way that the respective control valve is activated electronically as a function of an automatically requested target deceleration of the vehicle or as a function of an actuation, predetermined by the driver, via an actuating device. A second control unit is provided, which is configured to control the parking-brake valve electrically as a function of the automatically requested target deceleration of the vehicle if an electrical activation of the respective control valve has been prevented, for the purpose of developing an electronically/pneumatically controlled redundancy. Furthermore, the brake system is distinguished in that at least one bypass valve assigned to a control valve is provided, which is configured to activate the assigned control valve pneumatically, the pneumatic activation taking place as a function of the automatically requested target deceleration of the vehicle or as a function of the actuation, predetermined by the driver, of the actuating device if an electrical activation of the respective control valve has been prevented, for the purpose of expanding the electronically/pneumatically controlled redundancy. In this context, in one embodiment a single-channel front-axle modulator, a single-channel rear-axle modulator and also a central module are provided in the brake system. Both the front axle and the rear axle are equipped with ABS valves which act on service-brake actuators on the respective axles.

From EP 1 541 437 B1 an electronic brake system for a vehicle with at least two brake circuits is furthermore known, in which a brake-circuit controller has been assigned in each instance to a brake circuit and which possesses a central control device for all the brake circuits. Furthermore, a brake pedal is provided which exhibits two autonomous braking-request receiving means, wherein in the event of failure of the central control device, or if a fault of the central control device is detected, a first brake-circuit controller of the brake-circuit controllers can carry out the activation of a brake circuit independently of the central control unit. Each of the braking-request receiving means takes the form of a dual displacement angle or force sensor, or of a single displacement angle or force sensor, and the self-sufficient first braking-force controller is supplied with electrical energy independently of the central control device.

Even though the prior systems generally operate well and are also employed, there is still a demand for cost-effective systems that use components that are as inexpensive as possible, are easy to install and scalable, that is, are capable of being expanded to various vehicle configurations (for instance, with or without additional axle, several rear axles, or trailer variants) in straightforward manner, as far as possible without high additional expenditure.

SUMMARY

In a first aspect, the present disclosure achieves the aforementioned object in the case of an electronically controlled pneumatic brake system of the aforementioned type in that the central electronic control unit with the rear-axle modulator and/or with the front-axle modulator takes the form of a structural unit.

The disclosure takes advantage of the perception that a particularly simple and cost-effective brake system can be constructed by use being made, both for the front axle and for the rear axle, of single-channel axle modulators which are only able to modulate a pressure, but, in order to obtain individual-wheel braking, ABS valves have been connected in series downstream of these single-channel axle modulators. ABS valves are readily available structural elements that are widely employed. In the context of the present disclosure, ABS valves are also employed on the rear axle. In order to obtain a more far-reaching integration and a cost-effective installation, according to the disclosure there is provision, in addition, that the central electronic control unit with the rear-axle modulator and/or with the front-axle modulator has been formed from a structural unit. In particular, the integration with the rear-axle modulator is advantageous, since in this way construction space can be saved and installation costs can be reduced. Since the rear-axle modulator also takes the form of a single-channel axle modulator, this integration is particularly easy. In other conventional brake systems, the rear-axle modulator often takes the form of a dual-channel axle modulator and therefore displays a more extensive intelligence of its own than is the case with single-channel axle modulators. In this way, various advantages can be realized simultaneously with the present disclosure: both the use of simple structural elements such as ABS valves, and the integration of simple and known structural elements into modules, in order by this means to save construction space and cabling effort. Moreover, such an approach can be scaled relatively easily and extended to further axles. If, for instance, two rear axles are provided for the utility vehicle, the further axle modulator provided for the further rear axle can also be integrated jointly into the structural unit. The installation effort is accordingly not increased.

According to a first embodiment, the central electronic control unit with the rear-axle modulator and/or with the front-axle modulator takes the form of a module. By this means, a further integration of the two or more structural elements is obtained. In the present context, "integration into a module" is understood to mean that the central electronic control unit and the rear-axle modulator or front-axle modulator exhibit a common electronic controller, that is, a common electronic intelligence. They have not only been configured jointly as a structural unit but have also been functionally integrated. By this means, the number of electronic structural elements can be reduced in advantageous manner.

For the precise configuration of the front-axle and rear-axle modulators, it can preferably be provided that the front-axle modulator exhibits one or more electrically switchable pneumatic valves, for modulating a front-axle brake pressure at the first and second front-axle ABS valves, and the rear-axle modulator exhibits one or more electrically switchable pneumatic valves, for modulating a rear-axle brake pressure at the first and second rear-axle ABS valves. In a concrete configuration, both the front-axle modulator and the rear-axle modulator may exhibit one or more electrically switchable 2/2-way or 3/2-way valves, which constitute a pilot control unit, and a relay valve capable of being actuated pneumatically, which constitutes a main valve unit. Via the pilot control unit, a control pressure can then be made available at the corresponding relay valve which thereupon modulates a working pressure as front-axle brake pressure or rear-axle brake pressure, respectively. Via the actuation of the corresponding ABS valves, the modulated front-axle or rear-axle brake pressure can then be lowered so as to be appropriate for the wheel, in order to avoid a locking of the corresponding wheel.

Moreover, it is preferred that the front-axle modulator and/or the rear-axle modulator exhibit(s) a microcontroller which is connected to the central control unit for the purpose of receiving front-axle signals or rear-axle signals, respectively, and for switching the respective electrically switchable pneumatic valves. In this embodiment, both the front-axle modulator and the rear-axle modulator exhibit their own microcontroller, which has been provided to receive and to put into effect a front-axle signal or rear-axle signal, respectively, and subsequently to switch the electrically switchable pneumatic valves provided in the front-axle or rear-axle modulator, respectively.

Alternatively, there may be provision that the front-axle modulator and/or the rear-axle modulator are/is connected to the central control unit, in order to receive from the latter first and/or second switching signals for direct switching of the respective electrically switchable pneumatic valves. In this way, the rear-axle modulator or the front-axle modulator receives switching signals directly and in this case does not need its own microcontroller. The switching signals for the respective electrically switchable pneumatic valves are generated directly in the central control unit and are made available by the latter. There may also be provision that, for instance, the front-axle modulator possesses its own microcontroller but the rear-axle modulator does not and, in turn, has been integrated into a module with the central electronic control unit.

According to another embodiment, the first and second front-axle ABS valves are arranged directly on the front-axle modulator and constitute with the latter a structural unit. In this way, the integration of the individual components can be advanced still further. The installation effort is reduced, and cabling can also be reduced. For this purpose, the first and second front-axle ABS valves may have been either flange-mounted onto a housing of the front-axle modulator or built into the housing of the front-axle modulator.

The same may also apply to the first and second rear-axle ABS valves, which then have been arranged directly on the rear-axle modulator and constitute with the latter a structural unit. If the rear-axle modulator has been integrated with the central control unit, the first and second rear-axle ABS valves have preferentially been arranged on this structural unit.

In a further embodiment, the first and second front-axle ABS valves are electrically connected to the central control unit for the purpose of forming a closed control loop. In corresponding manner, the first and second rear-axle ABS valves have preferentially also been electrically connected to the central control unit for the purpose of forming a closed control loop. The central control unit can preferentially make signals for switching available at the front-axle modulator and at the rear-axle modulator, either signals for direct switching of the valves or signals that are put into effect by microcontrollers in the front-axle and rear-axle modulator, respectively. The electronically controlled pneumatic brake system can preferentially also include wheel-speed sensors on the front and rear axles, which are likewise connected to the central control unit. In this way, by evaluation of wheel-speed signals supplied by the wheel-speed sensors, the central control unit can in corresponding manner activate the first and second front-axle and rear-axle ABS valves, respectively, in order to avoid a locking of individual wheels. In this way, the control of the brake system is realized via the central control unit, whereas the front-axle and rear-axle modulators no longer require their own intelligence. Accordingly, inexpensive structural elements can be employed here.

In a further embodiment, the electronically controlled pneumatic brake system exhibits a further single-channel rear-axle modulator for activating third and fourth rear-axle brake actuators, a third rear-axle ABS valve being interposed between the further rear-axle modulator and the third rear-axle brake actuator, and a fourth rear-axle ABS valve being interposed between the further rear-axle modulator and the fourth rear-axle service-brake actuator. This embodiment is particularly preferred if the utility vehicle exhibits two rear axles, namely the rear axle and a further rear axle.

In such an embodiment it is preferred that the further single-channel rear-axle modulator with the rear-axle modulator and with the central control unit takes the form of the structural unit. The rear-axle modulator, the further rear-axle modulator and the central control unit have preferentially been integrated jointly as a module.

In such an embodiment it can preferably also be provided that the third and fourth rear-axle ABS valves are also arranged directly on the further rear-axle modulator and constitute with the latter a structural unit. These valves may also have been flange-mounted onto the rear-axle modulator or integrated with the latter into a housing.

Furthermore, it is preferred that the third and fourth rear-axle ABS valves are electrically connected to the central control unit for the purpose of forming a closed control loop. Wheel-speed sensors, which, in turn, are connected to the central control unit, have also preferentially been provided on the further rear axle.

For further advantages and preferred embodiments, reference is made to the entire description.

In a second aspect, the disclosure achieves the aforementioned object in the case of a vehicle with a front axle, with at least one rear axle and by virtue of an electronically controlled pneumatic brake system according to one of the embodiments, described above, of an electronically controlled pneumatic brake system according to the first aspect of the disclosure.

BRIEF DESCRIPTION OF THE DRAWINGS

The invention will now be described with reference to the drawings wherein.

DESCRIPTION OF THE PREFERRED EMBODIMENTS

Figure 1:
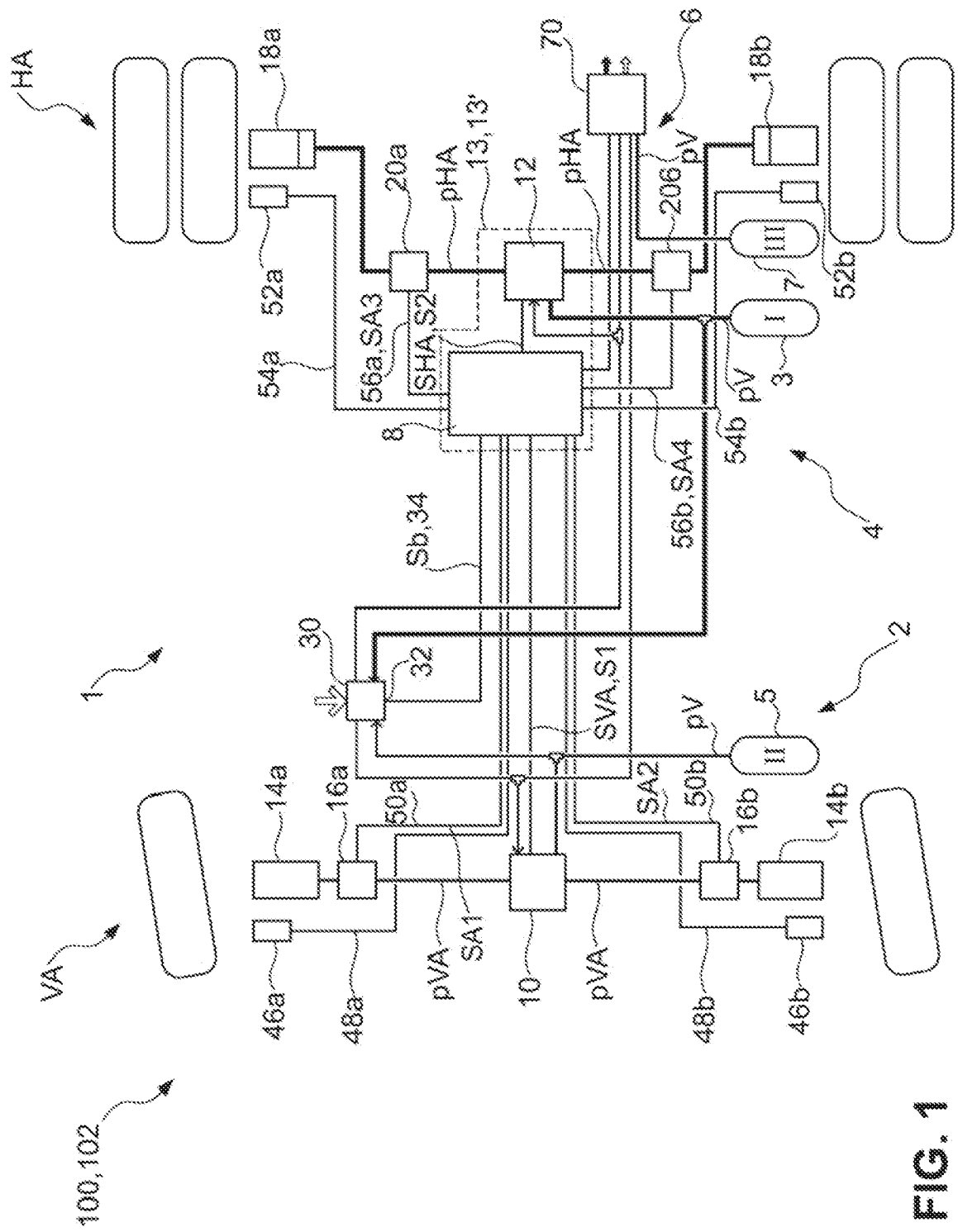
FIG. 1 is a schematic layout of an electronically controlled pneumatic brake system according to a first embodiment.

A vehicle 100, namely, in particular, a utility vehicle 102, exhibits a front axle VA and a rear axle HA. In order to slow down the front axle VA and rear axle HA, the vehicle 100 exhibits an electronically controlled pneumatic brake system 1.

The electronically controlled pneumatic brake system 1 exhibits a front-axle brake circuit 2 for the front axle VA and a rear-axle brake circuit 4 for the rear axle HA. In addition, the electronically controlled pneumatic brake system 1 also exhibits a trailer brake circuit 6, which will be described precisely further below. The rear-axle brake circuit 4 is fed by a first compressed-air supply 3 which makes supply pressure pV available. The front-axle brake circuit 2 is fed by a second compressed-air supply 5 which likewise makes supply pressure pV available. In corresponding manner, the trailer brake circuit 6 is supplied by a third compressed-air supply 7 which likewise makes supply pressure pV available. The first, second and third compressed-air supplies 3, 5, 7 are supplied via an air-treatment system which is not shown here.

For the purpose of controlling the electronically controlled pneumatic brake system 1, a central electronic control unit 8 is provided which may also be designated as the central module or ECU. The unit controls, in particular, a front-axle modulator 10, which is provided for the front axle VA, and a rear-axle modulator 12, which is provided for the rear axle HA. The front-axle modulator 10 activates first and second front-axle service-brake actuators 14a, 14b, and the rear-axle modulator 12 activates first and second rear-axle service-brake actuators 18a, 18b.

Both the front-axle modulator 10 and the rear-axle modulator 12 are of single-channel configuration and each only make a pressure available both for the left side and for the right side of the vehicle. The front-axle modulator 10 makes a front-axle brake pressure pVA available, and the rear-axle modulator 12 makes a rear-axle brake pressure pHA available. But in order now to be able to achieve slip-controlled, individual-wheel braking, a first front-axle ABS valve 16a has been interposed between the front-axle modulator 10 and the first front-axle service-brake actuator 14a, and a second front-axle ABS valve 16b has been interposed between the front-axle modulator 10 and the second front-axle service-brake actuator 14b. In corresponding manner, a first rear-axle ABS valve 20a has been interposed between the rear-axle modulator 12 and the first rear-axle service-brake actuator 18a, and a second rear-axle ABS valve 20b has been interposed between the rear-axle modulator 12 and the second rear-axle service-brake actuator 18b. In this way, both the front axle VA and the rear axle HA can be slowed down in slip-controlled manner.

Figure 3:
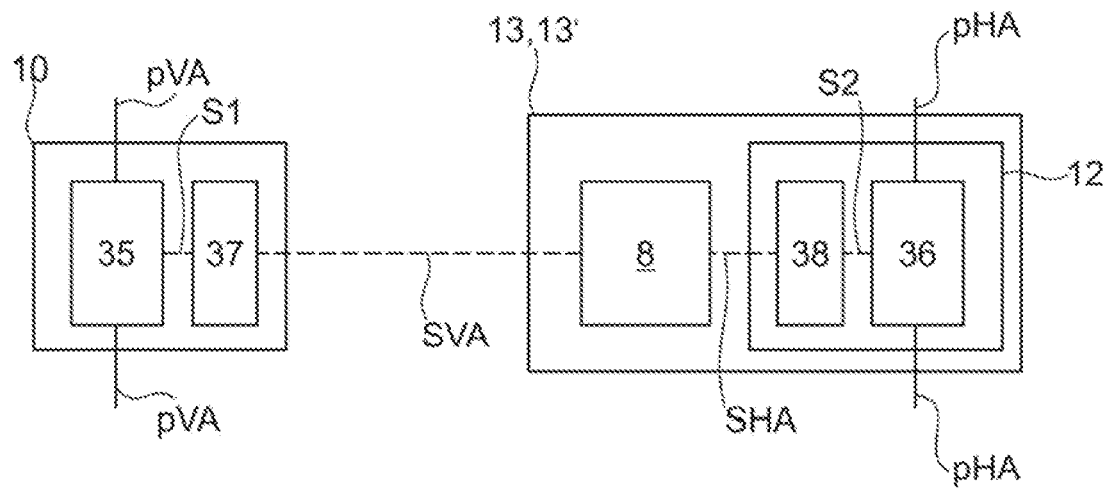
FIG. 3 is a schematic representation of a front-axle modulator, central module and rear-axle modulator; and, FIG. 4 is a further schematic representation of front-a axle modulator, central module and rear-axle modulator.

For the purpose of making a braking request available, the electronically controlled pneumatic brake system 1 according to the present embodiment (FIG. 1) exhibits a braking-value transducer 30. According to this embodiment, the braking-value transducer 30 exhibits an electrical terminal 32, via which an electronic braking-request signal SB is made available upon actuation of the braking-value transducer 30 by a driver of the vehicle. The electronic braking-request signal SB is made available at the central electronic control unit 8 via a braking-signal line 34. The central electronic control unit 8 processes the electronic braking-request signal SB and makes either a front-axle signal SVA or a first switching signal S1 available at the front-axle modulator 10, and either a rear-axle signal SHA or a second switching signal S2 at the rear-axle modulator 12, depending upon the configuration of the front-axle modulator 10 and of the rear-axle modulator 12 (cf. also FIGS. 3 and 4).

In the context of the present embodiment (FIG. 1), the front-axle modulator 10 and the rear-axle modulator 12 may have been configured in various ways. Ordinarily, the front-axle modulator 10 exhibits an electropneumatic front-axle valve unit 35, and the rear-axle modulator 12 exhibits an electropneumatic rear-axle valve unit 36. These valve units each include one or more electrically switchable pneumatic valves for the respective modulating of the front-axle brake pressure pVA at the first and second front-axle ABS valves 16a, 16b, and of a rear-axle brake pressure pHA at the first and second rear-axle ABS valves 20a, 20b. The precise structure of such valve units will not be considered in any depth here and is known to a person skilled in the art. They may, in particular, include one or more 2/2-way or 3/2-way valves, which have been connected together as a pilot control unit, and/or relay valves which receive a pilot pressure and modulate the corresponding front-axle or rear-axle brake pressure pVA, pHA, respectively.

In a first variant of the configuration of the front-axle modulator 10 (cf. FIG. 3), the front-axle modulator 10 also includes, in addition to the electropneumatic front-axle valve unit 35, a front-axle microcontroller 37 which displays intelligence. In corresponding manner, the rear-axle modulator 12 may also exhibit a rear-axle microcontroller 38. In this case it is sufficient if the central electronic control unit 8 makes a front-axle signal SVA available at the front-axle microcontroller 37. In this case, the front-axle signal SVA is a signal that is derived from the electronic braking-request signal SB but, as a rule, does not yet specify a concrete switching of valves. The front-axle microcontroller 37 then puts the front-axle signal SVA into effect and automatically modulates a first switching signal S1 at the electropneumatic front-axle valve unit 35 which consequently switches, and generates the front-axle brake pressure pVA from the supply pressure pV made available at the front-axle modulator 10.

In corresponding manner, it is sufficient if the central electronic control unit 8 makes a rear-axle signal SHA available at the rear-axle microcontroller 38 if the rear-axle modulator 12 exhibits a rear-axle microcontroller 38 of such a type. The latter then also puts the rear-axle signal SHA into effect and makes a second switching signal S2 available at the electropneumatic rear-axle valve unit 36, which brings about the switching of one or more electropneumatic valves of the rear-axle valve unit 36, in order to generate the rear-axle brake pressure pHA from the supply pressure pV made available at the rear-axle modulator 12 from the first compressed-air supply 3.

Figure 4:
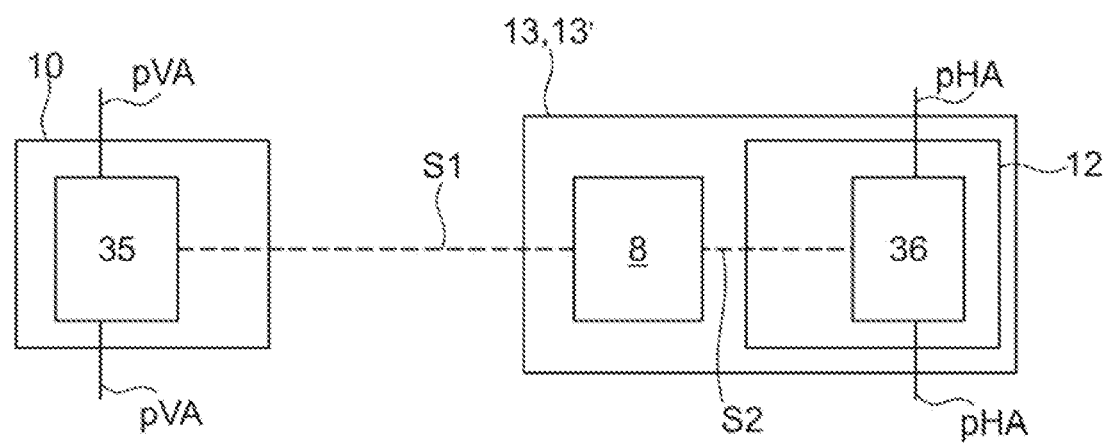

In variants of the embodiments shown here, however, the front-axle microcontroller 37 and/or the rear-axle microcontroller 38 may be dispensed with (cf. FIG. 4). In this case, the central electronic control unit 8 then makes the first and second switching signals S1, S2 directly available at the electropneumatic front-axle valve unit 35 and electropneumatic rear-axle valve unit 36, respectively, in order to switch these valve units. By this means, a saving can be made on microcontrollers, as a result of which the brake system 1 can be produced more cost-effectively overall.

In order to achieve a further simplification of the electronically controlled electropneumatic brake system 1, in the first embodiment (FIG. 1) the central electronic control unit 8 and the rear-axle modulator 12 have been integrated into a structural unit 13, more precisely into a module 13', that is, the central electronic control unit 8 and the rear-axle modulator 12 have not only been connected to one another as a structural unit but have been integrated into a common housing, so that, even if the rear-axle modulator 12 is to include a rear-axle microcontroller 38, the latter may have been integrated with the central electronic control unit 8, so only one electronic structural unit is provided for the module 13'.

In alternative embodiments, the central electronic control unit 8 may also have been integrated with the front-axle modulator 10.

Figure 2:
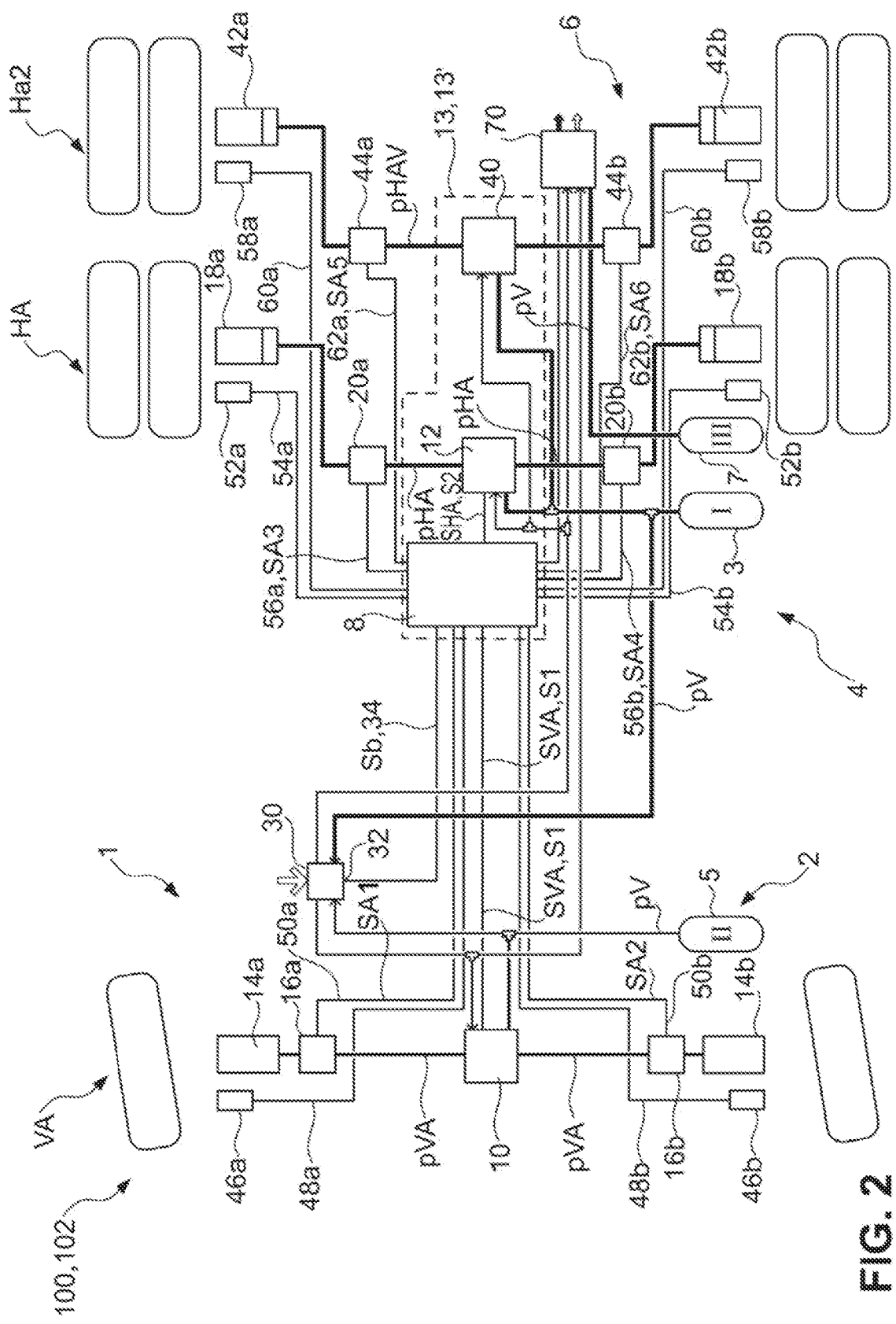
FIG. 2 is a schematic layout of an electronically controlled pneumatic brake system according to a second embodiment.

The electronically controlled pneumatic brake system 1 disclosed herein can be expanded particularly easily to other vehicle variants. In this respect, FIG. 2 shows an embodiment of a utility vehicle 102 which, in addition to the rear axle HA, also includes a further rear axle HA2. The further rear axle HA2 is part of the rear-axle brake circuit 4 and is controlled via a further rear-axle modulator 40 which may have been configured substantially in accordance with rear-axle modulator 12. Via the further rear-axle modulator 40, a further rear-axle brake pressure pHAV, which may be identical to the rear-axle brake pressure pHA, is modulated. This further rear-axle brake pressure pHAV is made available at the third and fourth rear-axle service-brake actuators 42a. 42b. In order once again to achieve a slip control here, as also in the case of the other axles VA, HA. ABS valves are provided, namely a third rear-axle ABS valve 44a and a fourth rear-axle ABS valve 44b, which have respectively been interposed between the further rear-axle modulator 40 and the third and fourth rear-axle service-brake actuators 42a, 42b. In this embodiment (FIG. 2), the further rear-axle modulator 40 has also been integrated into the structural unit 13 or into the module 13'. In this way, the installation effort is distinctly reduced, and a saving can be made on a further microcontroller, namely the one for the further rear-axle modulator 40.

Both in the first embodiment (FIG. 1) and in the second embodiment (FIG. 2), all the axles VA, HA, HA2 are equipped with wheel-speed sensors. In this respect, first and second wheel-speed sensors 46a, 46b are provided for the front axle VA. The first and second wheel-speed sensors 46a, 46b are connected to the central electronic control unit 8 or to the structural unit 13 or to the module 13' via first and second sensor lines 48a, 48b. The first and second wheel-speed sensors 46a, 46b make wheel-speed signals of the front axle VA available at the central electronic control unit 8 via the first and second sensor lines 48a, 48b. The central electronic control unit 8 is, in turn, connected via first and second ABS lines 50a, 50b to the first and second front-axle ABS valves 16a, 16b, in order to activate the valves. If it is ascertained by the central electronic control unit 8 that one of the wheels of the front axle VA is locked, the central electronic control unit 8 transmits first and second ABS signals SA1, SA2 via the first and second ABS lines 50a, 50b, in order to control the first and second front-axle ABS valves 16a, 16b appropriately, in order in this way to bleed the front-axle brake pressure pVA made available in each instance at the first and second front-axle service-brake actuators 14a, 14b, and in this way to reduce a braking force.

In corresponding manner, third and fourth wheel-speed sensors 52a, 52b are provided on the rear axle HA, which are connected to the central electronic control unit 8 via corresponding third and fourth sensor lines 54a, 54b. The central electronic control unit 8 is connected to the first and second rear-axle ABS valves 20a, 20b via third and fourth ABS lines 56a, 56b, and makes third and fourth ABS signals SA3, SA4 available at these valves in corresponding manner. In this way, the rear axle HA can also be slip-controlled.

In the second embodiment (FIG. 2), this system has also been put into effect for the further rear axle HA2. In this respect, fifth and sixth wheel-speed sensors 58a, 58b are provided for the further rear axle HA2, which are connected to the central electronic control unit 8 via fifth and sixth sensor lines 60a, 60b. The central electronic control unit 8 is, in turn, connected to the third and fourth rear-axle ABS valves 44a, 44b via fifth and sixth ABS lines 62a, 62b, and makes fifth and sixth ABS signals SA5, SA6 available at these valves.

In this way, the complete electronically controlled pneumatic brake system 1 can be configured to be slip-controlled. In this connection, use is made of simple structural elements such as ABS valves. In addition, one electronic control unit suffices overall in order to control the brake system. Further microcontrollers or such like are not required. This system can be installed, integrated and also scaled particularly easily.

As is clear, moreover, from FIGS. 1 and 2, for the electronically controlled pneumatic brake system 1 a trailer brake circuit 6 is also provided, which here is optional. In the trailer brake circuit 6 a trailer control valve 70 is shown here purely by way of example, which may have been configured in conventional manner. The trailer control valve 70 is fed from the third compressed-air supply 7 and likewise receives signals necessary for its control from the central electronic control unit 8. Depending upon the configuration of the central electronic control unit 8, a microcontroller in the trailer control valve 70 can accordingly also be dispensed with.

It is understood that the foregoing description is that of the preferred embodiments of the invention and that various changes and modifications may be made thereto without departing from the spirit and scope of the invention as defined in the appended claims.

LIST OF REFERENCE SYMBOLS (PART OF THE DESCRIPTION)

1 Electronically controlled pneumatic brake system
2 Front-axle brake circuit
3 First compressed-air supply
4 Rear-axle brake circuit
5 Second compressed-air supply
6 Trailer brake circuit
7 Third compressed-air supply
8 Central electronic control unit
10 Front-axle modulator
12 Rear-axle modulator
13 Structural unit
13' Module
14a First front-axle service-brake actuator
14b Second front-axle service-brake actuator
16a First front-axle ABS valve
16b Second front-axle ABS valve
18a First rear-axle service-brake actuator
18b Second rear-axle service-brake actuator
20a First rear-axle ABS valve
20b Second rear-axle ABS valve
30 Braking-value transducer
32 Electrical terminal
34 Braking-signal line
35 Electropneumatic front-axle valve unit
36 Electropneumatic rear-axle valve unit
37 Front-axle microcontroller
38 Rear-axle microcontroller
40 Further rear-axle modulator
42a Third rear-axle service-brake actuator
42b Fourth rear-axle service-brake actuator
44a Third rear-axle ABS valve
44b Fourth rear-axle ABS valve
46a First wheel-speed sensor
46b Second wheel-speed sensor
48a First sensor line
48b Second sensor line
50a First ABS line
50b Second ABS line
52a Third wheel-speed sensor
52b Fourth wheel-speed sensor
54a Third sensor line
54b Fourth sensor line
56a Third ABS line
56b Fourth ABS line
58a Fifth wheel-speed sensor
58b Sixth wheel-speed sensor
60a Fifth sensor line
60b Sixth sensor line
62a Fifth ABS line
62b Sixth ABS line
70 Trailer control valve
100 Vehide
102 Utility vehide
pHA Rear-axle brake pressure
pHAV Further rear-axle brake pressure
pV Supply pressure
pVA Front-axle brake pressure
VA Front axle
HA Rear axle
HA2 Further rear axle
SB Electronic braking-request signal
S1 First switching signal
S2 Second switching signal
SVA Front-axle signal
SHA Rear-axle signal
SA1 First ABS signal
SA2 Second ABS signal
SA3 Third ABS signal
SA4 Fourth ABS signal
SA5 Fifth ABS signal
SA6 Sixth ABS signal

What is claimed is:

1. An electronically controlled pneumatic brake system for a vehicle, the system comprising:
    a front-axle brake circuit with a single-channel front-axle modulator configured to activate a first front-axle service-brake actuator and a second front-axle service-brake actuator;
    a first front-axle ABS valve interposed between the single-channel front-axle modulator and the first front-axle service-brake actuator;
    a second front-axle ABS valve interposed between the front-axle modulator and the second front-axle service-brake actuator:
    a rear-axle brake circuit with at least one single-channel rear-axle modulator configured to activate a first rear-axle service-brake actuator and a second rear-axle service-brake actuator:
    a first rear-axle ABS valve interposed between the at least one rear-axle modulator and the first rear-axle service-brake actuator;
    a second rear-axle ABS valve interposed between the at least one rear-axle modulator and the second rear-axle service-brake actuator;
    a braking-value transducer having at least one electrical terminal for providing an electronic braking request signal:
    a central electronic control unit connected at least to the braking-value transducer for receiving the electronic braking request signal;
    the central electronic control unit being further connected to the single-channel front-axle modulator and the at least one single-channel rear-axle modulator for controlling the single channel front-axle modulator and the at least one single-channel rear-axle modulator; and,
    wherein the central electronic control unit is formed as a structural unit with at least one of the at least one single-channel rear-axle modulator and the single-channel front-axle modulator.

2. The electronically controlled pneumatic brake system of claim 1, wherein the front-axle modulator includes at least one first electrically switchable pneumatic valve for modulating a front-axle brake pressure at the first front-axle ABS valve and the second front-axle ABS valve; and, the at least one single channel rear-axle modulator includes at least one second electrically switchable pneumatic valve for modulating a rear-axle brake pressure at the first and second rear-axle ABS valves.

3. The electronically controlled pneumatic brake system of claim 2, wherein the single-channel front-axle modulator further includes a front-axle microcontroller connected to the central control unit for receiving front-axle signals and for switching the at least one first electrically switchable pneumatic valve.

4. The electronically controlled pneumatic brake system of claim 2, wherein the at least one single-channel rear-axle modulator includes a rea axle microcontroller connected to the central electronic control unit for receiving rear-axle signals and for switching the at least one second electrically switchable pneumatic valve.

5. The electronically controlled pneumatic brake system of claim 2, wherein:
the single-channel front-axle modulator further includes a front-axle microcontroller connected to the central control unit for receiving front-axle signals and for switching the at least one first electrically switchable pneumatic valve; and,
the at least one single-channel rear-axle modulator includes a rear-axle microcontroller connected to the central control unit for receiving rear-axle signals and for switching the at least one second electrically switchable pneumatic valve.

6. The electronically controlled pneumatic brake system of claim 2, wherein at least one of the single-channel front-axle modulator and the at least one single-channel rear-axle modulator is connected to the central electronic control unit in order to receive from the central electronic control unit corresponding first and/or second switching signals for direct switching of corresponding ones of the first electrically switchable pneumatic valve and the second electrically switchable pneumatic valve.

7. The electronically controlled pneumatic brake system of claim 1 further comprising:
a further single-channel rear-axle modulator for activating a third rear-axle service-brake actuator and a fourth rear-axle service-brake actuator;
a third rear-axle ABS valve interposed between the further rear-axle modulator and the third rear-axle service-brake actuator; and,
a fourth rear-axle ABS valve interposed between the further rear-axle modulator and the fourth rear-axle service-brake actuator.

8. The electronically controlled pneumatic brake system of claim 7, wherein the further single-channel rear-axle modulator with the rear-axle modulator and the central electronic control unit are formed as the structural unit.

9. The electronically controlled pneumatic brake system of claim 7, wherein the third rear-axle ABS valve and the fourth rear-axle ABS valve are arranged directly on the further rear-axle modulator and form a structural unit with the further rear-axle modulator.

10. The electronically controlled pneumatic brake system of claim 7, wherein the third rear-axle ABS valve and the fourth rear-axle ABS valve are electrically connected to the central electronic control unit for forming a closed control loop.

11. The electronically controlled pneumatic brake system of claim 1 wherein the central electronic control unit is formed as a module with at least one of the at least one single-channel rear-axle modulator and the single-channel front-axle modulator.

12. The electronically controlled pneumatic brake system of claim 1,
wherein the first front-axle ABS valve and the second front-axle ABS valve are arranged directly on the single-channel front-axle modulator and form a structural unit with the single-channel front-axle modulator.

13. The electronically controlled pneumatic brake system of claim 1,
wherein the first rear-axle ABS valve and the second rear-axle ABS valve are arranged directly on the at least one single-channel rear-axle modulator and form a structural unit with the at least one single-channel rear-axle modulator.

14. The electronically controlled pneumatic brake system of claim 1, wherein the first front-axle ABS valve and the second front-axle ABS valve are electrically connected to the central electronic control unit for forming a closed control loop.

15. The electronically controlled pneumatic brake system of claim 1, wherein the first rear-axle ABS valve and second rear-axle ABS valve are electrically connected to the central electronic control unit for forming a closed control loop.

16. The electronically controlled pneumatic brake system of claim 1, wherein the electronically controlled pneumatic brake system is for a utility vehicle.

17. A vehicle comprising:
a front axle:
at least one rear axle;
an electronically controlled pneumatic brake system having a front-axle brake circuit with a single-channel front-axle modulator configured to activate a first front-axle service-brake actuator and a second front-axle service-brake actuator;
the electronically controlled pneumatic brake system including a first front-axle ABS valve and a second front-axle ABS valve;
the first front-axle ABS valve being interposed between the single-channel front-axle modulator and the first front-axle service-brake actuator;
the second front-axle ABS valve being interposed between the front-axle modulator and the second front-axle service-brake actuator;
the electronically controlled pneumatic brake system further having a rear-axle brake circuit with at least one single-channel rear-axle modulator configured to activate a first rear-axle service-brake actuator and a second rear-axle service-brake actuator;
the electronically controlled pneumatic brake system further including a first rear-axle ABS valve, a second rear-axle ABS valve, a braking-value transducer, and a central electronic control unit;
the first rear-axle ABS valve being interposed between the at least one rear-axle modulator and the first rear-axle service-brake actuator;
the second rear-axle ABS valve being interposed between the rear-axle modulator and the second rear-axle service-brake actuator;
the braking-value transducer having at least one electrical terminal for providing an electronic braking request signal; and
the central electronic control unit being connected at least to the braking-value transducer for receiving the electronic braking request signal;
the central electronic control unit being further connected to the single-channel front-axle modulator and the at least one single-channel rear-axle modulator for controlling the single channel front-axle modulator and the at least one single-channel rear-axle modulator; and,
wherein the central electronic control unit is formed as a structural unit with at least one of the at least one single-channel rear-axle modulator and the single-channel front-axle modulator.

18. The vehicle of claim 17, wherein the vehicle is a utility vehicle.

* * * * *

UNITED STATES PATENT AND TRADEMARK OFFICE
CERTIFICATE OF CORRECTION

Page 1 of 1

PATENT NO. : 11,926,302 B2
APPLICATION NO. : 17/517483
DATED : March 12, 2024
INVENTOR(S) : Arne Michaelsen It is certified that error appears in the above-identified patent and that said Letters Patent is hereby corrected as shown below:

In the Specification

<u>In Column 5</u>:
Line 37: delete "front-a" and insert -- a front -- therefor.

In the Claims

<u>In Column 11</u>:
Line 6: in Claim 4, "rea" and insert -- rear -- therefor.

Signed and Sealed this
Second Day of July, 2024

Katherine Kelly Vidal
*Director of the United States Patent and Trademark Office*